United States Patent
Dargude et al.

(10) Patent No.: US 11,782,965 B1
(45) Date of Patent: Oct. 10, 2023

(54) SYSTEMS AND METHODS FOR NORMALIZING DATA STORE CLASSIFICATION INFORMATION

(71) Applicant: Veritas Technologies LLC, Mountain View, CA (US)

(72) Inventors: Shailesh A. Dargude, San Jose, CA (US); Satish Grandhi, Santa Clara, CA (US); Joshua V. Stageberg, San Francisco, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 1270 days.

(21) Appl. No.: 16/116,522

(22) Filed: Aug. 29, 2018

Related U.S. Application Data (60) Provisional application No. 62/653,541, filed on Apr. 5, 2018.

(51) Int. Cl.
| | | |
|---|---|---|
| *G06F 16/35* | (2019.01) | |
| *G06N 20/00* | (2019.01) | |
| *G06F 21/57* | (2013.01) | |
| *G06F 16/33* | (2019.01) | |
| *G06F 18/214* | (2023.01) | |

(52) U.S. Cl.
CPC .......... *G06F 16/35* (2019.01); *G06F 16/3347* (2019.01); *G06F 18/214* (2023.01); *G06F 21/577* (2013.01); *G06N 20/00* (2019.01)

(58) Field of Classification Search
CPC .... G06F 16/35; G06F 16/3347; G06F 21/577; G06K 9/6256; G06N 20/00
See application file for complete search history.

(56) References Cited

U.S. PATENT DOCUMENTS

| | | | | |
|---|---|---|---|---|
| 10,705,796 | B1 * | 7/2020 | Doyle | G06N 5/003 |
| 2011/0296003 | A1 * | 12/2011 | McCann | H04L 67/22 |
| | | | | 709/224 |
| 2013/0254231 | A1 * | 9/2013 | Decker | G06F 16/24573 |
| | | | | 707/770 |
| 2015/0317339 | A1 | 11/2015 | Vranyes et al. | |

(Continued)

OTHER PUBLICATIONS

Veritas, "Information Map Whitepaper Security In-Depth", URL: https://www.veritas.com/content/support/en US/doc/Ka6j0000000L8hfAAC, Jan. 1, 2017, 25 pages.

(Continued)

*Primary Examiner* — Tadesse Hailu
*Assistant Examiner* — Darrin Hope
(74) *Attorney, Agent, or Firm* — Greenberg Traurig, LLP (57) ABSTRACT

The disclosed computer-implemented method for normalizing data store classification information may include (1) receiving, at the computing device, classification information from multiple data store content classification sources, (2) training a continuous bag of words (CBOW) classification model with the classification information, (3) receiving a classification tag from a data store for which respectively stored data is classified by one of the data store content classification sources, and (4) classifying, with the trained CBOW classification model, the received classification tag to a corresponding command tag, wherein the command tag represents a meaning of the classification tag. Various other methods, systems, and computer-readable media are also disclosed.

20 Claims, 4 Drawing Sheets

(56) References Cited

U.S. PATENT DOCUMENTS

2017/0091201 A1* 3/2017 Chabot .................. G06F 16/122
2017/0149793 A1* 5/2017 Spertus ............... G06F 21/6245

OTHER PUBLICATIONS

Veritas, "Veritas Information Map User Guide", URL: https://www.veritas.com/content/support/en US/doc/107111172-109780806-1, Nov. 21, 2017, 379 pages.
Kasturi et al., "Systems and Methods for Data Management of Multiple Cloud Services", U.S. Appl. No. 16/375,243, filed Apr. 4, 2019, 69 pages.
Dargude et al., "Systems and Methods for Computing a Risk Score for Stored Information", U.S. Appl. No. 16/116,490, filed Aug. 29, 2018, 52 pages.
Dargude et al., "Systems and Methods for Managing User Entitlements of Objects from Heterogeneous Content Sources", U.S. Appl. No. 16/374,409, filed Apr. 3, 2019, 59 pages.
Dargude et al., "Systems and Methods for Prioritizing and Detecting File Datasets Based on Metadata", U.S. Appl. No. 16/374,568, filed Apr. 3, 2019, 43 pages.
Grandhi et al., "Systems and Methods for Generating Resource Definitions for Micro-Service-Based Platform-as-a-Service Architecture", U.S. Appl. No. 16/115,020, filed Aug. 28, 2018, 60 pages.
Veritas, "Veritas Information Map Installation and Administration Guide", URL: https://www.veritas.com/content/support/en US/doc/109835244-109835565-1, Jan. 30, 2018, 81 pages.
International Search Report and Written Opinion received for PCT Application Serial No. PCT/US2019/025801 dated Jul. 12, 2019, 10 pages.
Veritas, "Information Map Feature Briefing Veritas Information Map", URL: https://www.veritas.com/content/support/en US/doc/ka6j0000000L71WAAS, Jan. 1, 2016, 8 pages.
Brownlee, Jason, "A Gentle Introduction to the Bag-of-Words Model" on "Machine Learning Mastery", as accessed on Sep. 28, 2018 at https://machinelearningmastery.com/gentle-introduction-bag-words-model/, 24 pages.
Socher et al., "CS 224D: Deep Learning for NLP Lecture Notes: Part I, Spring 2016", Stanford University, as accessed on Sep. 28, 2018 at "https://cs224d.stanford.edu/lecture_notes/notes1.pdf", 10 pages.

* cited by examiner

SYSTEMS AND METHODS FOR NORMALIZING DATA STORE CLASSIFICATION INFORMATION

CROSS REFERENCE TO RELATED APPLICATION

This application claims the benefit of U.S. Provisional Application No. 62/653,541, titled "MULTI-CLOUD DATA MANAGEMENT SYSTEMS AND METHODS", filed Apr. 5, 2018, the disclosure of which is incorporated, in its entirety, by this reference.

BACKGROUND

Different classification engines may classify content stored on modern data storage devices in order to provide administrators and users with details about stored files. However, different classification engines may generate different classification tags for the same stored information.

SUMMARY

As will be described in greater detail below, the instant disclosure describes various systems and methods for normalizing data store classification information. In some examples, the provided systems and methods may normalize, using machine learning algorithms, tags and rulesets provided by different data store classification sources to tags in a uniform tag set.

In one embodiment, a method for normalizing data store classification information may include (1) receiving, at the computing device, classification information from multiple data store content classification sources, (2) training a continuous bag of words (CBOW) classification model with the classification information, (3) receiving a classification tag from a data store for which respectively stored data may be classified by one of the data store content classification sources, and/or (4) classifying, with the trained CBOW classification model, the received classification tag to a corresponding command tag. In some examples, the command tag may represent a meaning of the classification tag.

In some embodiments, the classification information may include a tag and a ruleset. In some examples, the method may further include storing the classification information in a storage device. In an example, the classification sources may include at least one of an automatic classification source configured to classify stored data, a manual classification source, and/or a third-party classifier configured to classify stored data.

In an embodiment, the command tag may indicate a presence of personally identifiable information (PII).

In some embodiments, the method may further include (1) identifying, in response to classifying the received classification tag to the corresponding command tag, a potential security risk and/or (2) performing, in response to identifying the potential security risk, a security action in an attempt to ameliorate the potential security risk.

In some examples, the method may further include generating a report in response to classifying the received classification tag to the corresponding command tag. In an example, the method may further include sending the report to a user display. In an embodiment, the method may further include sending the report via a network device.

In some embodiments, the method may further include receiving a different classification tag and classifying the different classification tag with the trained CBOW classification model to the corresponding command tag. In some embodiments, the command tag may represent a meaning of the different classification tag.

In some examples, the method may further include (1) receiving, from the data store, tag data corresponding to data stored on the data store, (2) converting, using the trained CBOW classification model, the tag data to command tag data, and (3) generating a report from the command tag data.

In an example, the method may further include mapping the classification tag to the corresponding command tag and/or storing the mapping in a storage device. In an embodiment, the method may further include receiving the classification tag again and classifying, using the mapping, the classification tag to the corresponding command tag.

In one example, a system for normalizing data store classification information may include several modules stored in a memory device, including (1) a first receiving module, stored in a memory, that receives, at the system, classification information from multiple data store content classification sources, (2) a training module, stored in the memory device, that trains a CBOW classification model with the classification information, (3) a second receiving module, stored in the memory device, that receives a classification tag from a data store for which respectively stored data may be classified by one of the data store content classification sources, and/or (4) a classifying module, stored in the memory device, that classifies, with the trained CBOW classification model, the received classification tag to a corresponding command tag. In some embodiments, the command tag may represent a meaning of the classification tag. In some examples, at least one physical processor may execute the first receiving module, the training module, the second receiving module, and/or the classifying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at the computing device, classification information from multiple data store content classification sources, (2) train a CBOW classification model with the classification information, (3) receive a classification tag from a data store for which respectively stored data may be classified by one of the data store content classification sources, and (4) classify, with the trained CBOW classification model, the received classification tag to a corresponding command tag. In some embodiments, the command tag may represent a meaning of the classification tag.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for normalizing data store classification information. In some examples, the provided systems and methods may automatically generate reports and/or computer-initiated actions in order to adhere to compliance regulations, such as data privacy regulations.

In some embodiments, data stores such as cloud-based storage devices may automatically have stored content classified using various heuristic or machine learning capabilities. The data stores may also provide mechanisms for data owners to manually classify the data. In some examples, external or third-party classification engines may classify the stored files. In addition, customers may enable more than one classification engine to generate classification tags. However, different classification engines may generate different tags for the same stored information and each different classification engine may generate tags specific to respective rule engines of the classification engines. Thus, similar tags from different classification engines may have different meanings and different tags from different classification engines may have similar meanings. Further, data stores may not be capable of adding normalized and/or aggregated classification information to metadata repositories storing metadata describing respective stored files. In some examples, data stores may not be capable of providing a unified source of information about classification tags generated from various classification engines, across different content sources.

The provided techniques may normalize data store classification information to tags in a uniform tag set. In some examples, the provided systems and methods may enable classification processes to contribute classification information for normalizing data store classification information. For example, the provided systems and methods may normalize, using machine learning models such as continuous bag of words (CBOW) classification models, natural language processing models, and/or continuous bag of tokens (CBOT) classification models, information coming from various data store content classification sources.

In some embodiments, the provided techniques may receive, from various classification engines, classification information classifying information stored on content sources. For example, various classification engines may classify data and generate classification information based on rulesets. Connector modules may fetch classification information from the content sources. Fetching may be performed by (1) invoking specific command sets (e.g., provided by the content sources) to classify contents of files stored on the content sources, (2) retrieving classification tags for already classified files classified by users (e.g., by manually tagging content of files), and/or (3) by invoking specific command sets to instruct a third-party content source to classify the contents of the files and/or send results of classifying. In some examples, classification information may be stored in metadata storage devices.

In some examples, deep learning algorithms may normalize classification information (e.g., classification tags) to command tags that represent similar meanings and sematic relationships to the classification information. In addition, different classification engines may generate different classification information for the same file. Though the classification information may be different, the different classification information may mean substantially the same thing. For example, some classification engines may produce a classification tag of "PII_US" for a file, while other classification engines may generate a different classification tag of "Personal_Identifiable_Information_US" for the same file. In some examples, deep learning techniques such as CBOW and/or CBOT classification models may be trained as a natural language classifier to normalize received classification tags to command tags. Since deep learning may be based on neural networks, the machine learning models may have input neurons, output neurons, and hidden neurons, where a number of input neurons may be equal to a number of output neurons with a number of neurons in at least one the hidden layer being smaller. In some embodiments, the CBOW and/or CBOT classification models may be trained using various rules, descriptions and/or classification information from various classification rule engines. When the CBOW and/or CBOT classification models are trained and classification tags are input to the CBOW and/or CBOT classification models, the CBOW and/or CBOT classification models may output correlated tags (e.g., command tags). In some examples, command tags may have a broader meaning than respective associated classification tags.

By doing so, the systems and methods described herein may improve the overall functionality of various computing devices by automatically normalizing data store classification information, thus enabling a higher level of protection for sensitive information. Examples of computing devices in which the provided techniques may be implemented include, and are not limited to, laptop computers, tablet computers, desktop computers, wearable computing devices (e.g., smart watches, smart glasses), smartphone devices, identify verification devices, access control devices, and/or smart televisions. For example, the provided techniques may advantageously improve the functionality of computing devices by improving data protection services and/or software. Also, in some examples, the systems and methods described herein may advantageously improve the functionality of computing devices by automatically saving power, saving time, better managing information storage devices, and/or better managing network bandwidth utilization.

Figure 1:
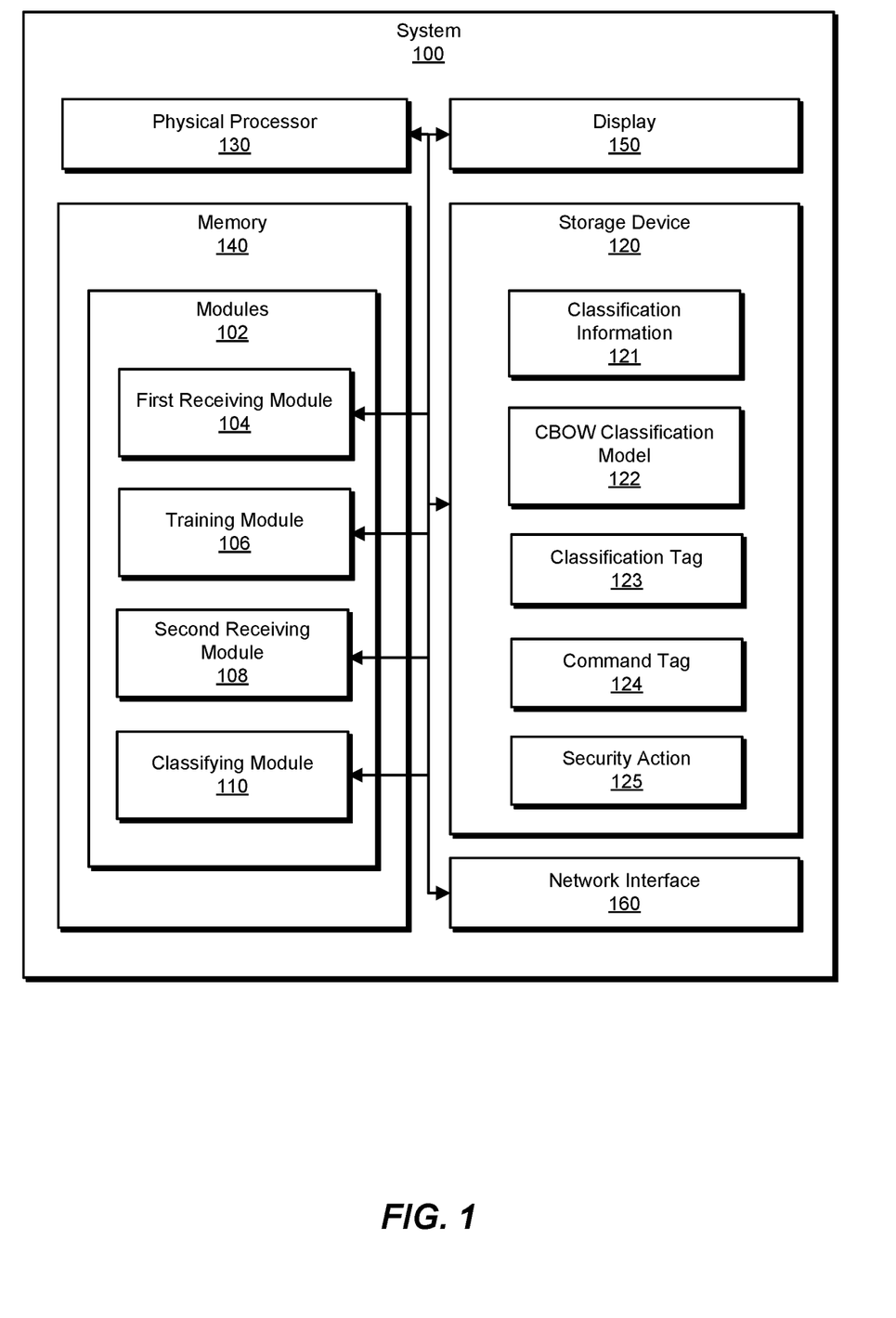
FIG. 1 is a block diagram of an example system for normalizing data store classification information.
Figure 2:
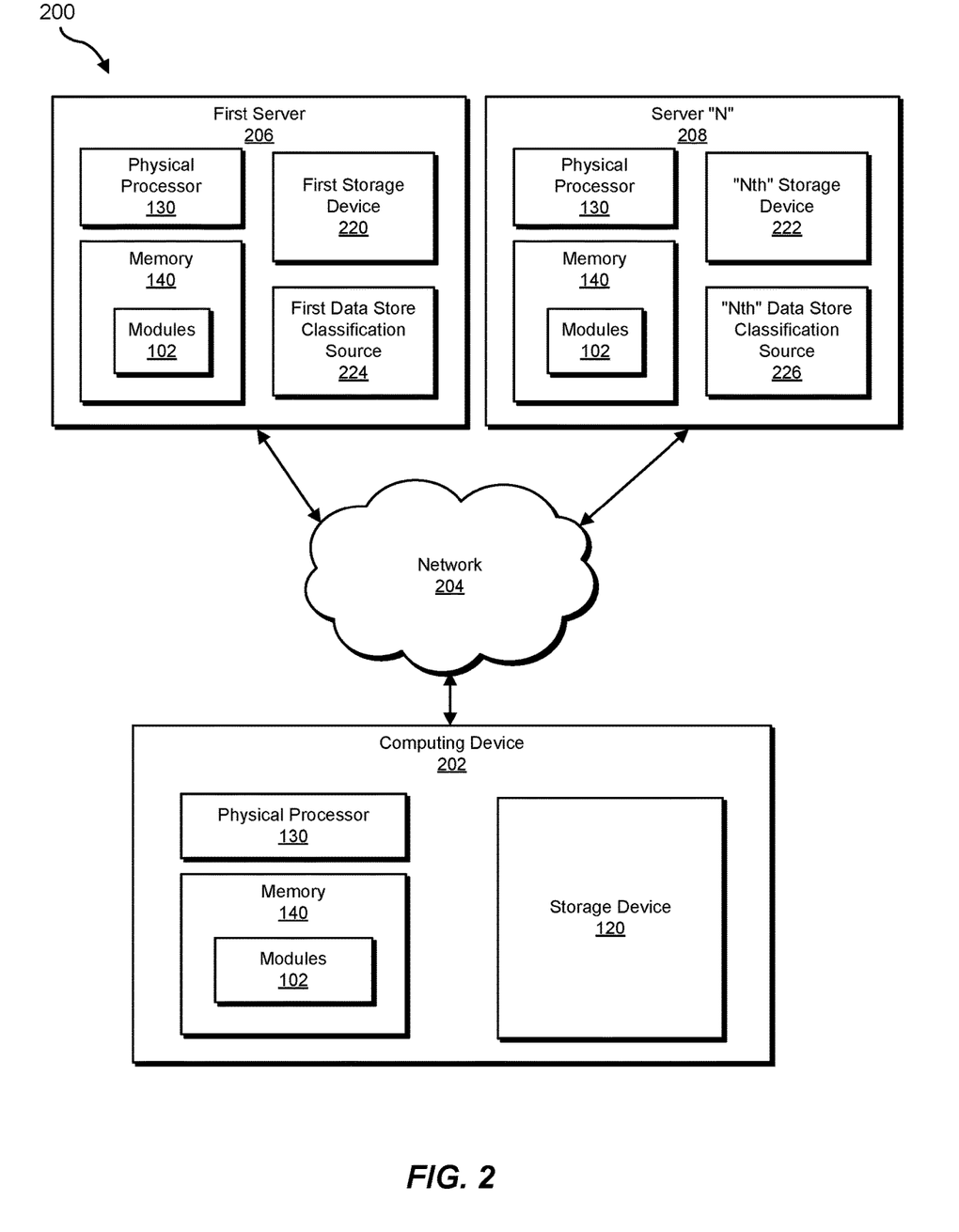
FIG. 2 is a block diagram of an additional example system for normalizing data store classification information.

The following will provide, with reference to FIGS. 1-2, detailed descriptions of example systems for normalizing data store classification information. Detailed descriptions of corresponding computer-implemented methods will also be provided in connection with FIGS. 3-4.

FIG. 1 is a block diagram of an example system 100 for normalizing data store classification information. As illustrated in this figure, example system 100 may include one or more modules 102 for performing one or more tasks. As will be explained in greater detail below, modules 102 may include a first receiving module 104, a training module 106, a second receiving module 108 and/or a classifying module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, first server 206, and/or server "N" 208). One or more of modules 102 in FIG. 1 may also represent all or portions of one or more special-purpose computers configured to perform one or more tasks.

Returning to FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain one or more of classification information 121, CBOW classification model 122, classification tag 123, command tag 124, and/or security action 125. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some non-limiting embodiments, classification information 121 may describe characteristics of classification tags produced by respective classification sources and rules used by the respective classification sources to assign the classification tags to respective files stored on storage devices such as storage device 120, a storage device coupled to first server 206 in FIG. 2, a storage device coupled to server "N" 208 in FIG. 2, and/or the like.

In some non-limiting embodiments, continuous bag-of-words (CBOW) classification model 122 may describe machine learning classifiers that may use a form of natural language processing to model text information and classify received text information. In some examples, CBOW classification model 122 may be trained with tags and rulesets associated with different data store classification sources. In some embodiments, CBOW classification model 122 may normalize, using machine learning algorithms, respective classification tags provided from the different data store classification sources to respective command tags in uniform tag sets.

In some non-limiting embodiments, classification tags 123 and/or command tags 124 may describe respective characteristics of files stored in data stores, information stores, repositories, and/or cloud storage devices.

In some non-limiting embodiments, security actions 125 may describe may include blocking access to devices (e.g., storage devices, memories, network devices, etc.), allowing limited access to devices, allowing read-only access to devices, encrypting information, and/or other acts limiting access to devices. In some examples, security actions may be performed automatically. In some embodiments, security actions may be performed based on a level of sensitivity of information associated with a classification tag and/or a command tag.

In some embodiments, security actions 125 may attempt to identify and/or ameliorate potential security risks. In additional examples, security actions 125 may include displaying, on user displays, warnings indicating that files and/or processes are potentially malicious. In some examples, security actions 125 may further include allowing access to information that only authenticated processes may access. In some examples, security actions 125 may be performed according to a data loss prevention (DLP) policy.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate normalizing data store classification information. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more displays, such as display 150. In some examples, display 150 may be a touchscreen. Thus, display 150 may be a touch sensing device configured to receive input, such as swipes, via users' touches imparted by users on display 150 when users touch display 150. In some examples, display 150 may implement technologies such as capacitive sensing, resistive sensing, pressure sensing, etc. Display 150 may also be an image (e.g., video) display device configured to display a user interface.

As illustrated in FIG. 1, example system 100 may also include one or more network interfaces, such as network interface 160. Network interface 160 broadly represents any type or form of communication device or adapter capable of facilitating communication between example system 100 and one or more additional devices (e.g., network 204 in FIG. 2). For example, in certain embodiments network interface 160 may facilitate communication between example system 100 and a private or public network including additional computing systems. Examples of network interface 160 include, without limitation, a wired network interface (such as a network interface card), a wireless network interface (such as a wireless network interface card), a modem, and any other suitable interface. In at least one embodiment, network interface 160 may provide a direct connection to a remote server via a direct link to a network, such as the Internet. Network interface 160 may also indirectly provide such a connection through, for example, a local area network (such as an Ethernet network), a personal area network, a telephone or cable network, a cellular telephone connection, a satellite data connection, or any other suitable connection.

In certain embodiments, network interface 160 may also represent a host adapter configured to facilitate communication between example system 100 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Network interface 160 may also allow example system 100 to engage in distributed or remote computing. For example, network interface 160 may receive instructions from a remote device or send instructions to a remote device for execution.

Example system 100 in FIG. 1 may be implemented in a variety of ways. For example, all or a portion of example system 100 may represent portions of example system 200 in FIG. 2. As shown in FIG. 2, system 200 may include a computing device 202 in communication via a network 204 with at least one server (e.g., a first server, a second server, . . . , an "Nth" server). As shown in FIG. 2, system 200 may include a computing device 202 in communication via a network 204 with first server 206 and/or server "N" 208. In one example, all or a portion of the functionality of modules 102 may be performed by computing device 202, first server 206, server "N" 208, and/or any other suitable computing system. As will be described in greater detail below, one or more of modules 102 from FIG. 1 may, when executed by at least one processor of computing device 202, first server 206 and/or server "N" 208, enable computing device 202, first server 206 and/or server "N" 208 to normalize data store classification information.

Computing device 202 generally represents any type or form of computing device capable of reading computer-executable instructions. For example, computing device 202 may represent a device running risk management software, anti-malware software, and/or compliance software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202, first server 206 and/or server "N" 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Servers 206-208 generally represent any type or form of computing device that reads computer-executable instructions. For example, servers 206-208 may represent servers running server-side software, such as storage device management software, risk management software, anti-malware software, and/or compliance software (e.g., data privacy compliance software). Additional examples of servers 206-208 include, without limitation, storage servers, database servers, application servers, and/or web servers configured to run certain software applications and/or provide various storage, database, and/or web services. Although illustrated as single entities in FIG. 2, servers 206-208 may include and/or represent a plurality of servers that work and/or operate in conjunction with one another.

In some examples, servers 206-208 may include one or more storage devices such as first storage device 220 and/or "Nth" storage device 222. First storage device 220 and "Nth" storage device 222 generally represent any type or form of volatile or non-volatile storage device or medium capable of storing data and/or computer-readable instructions. In one example, first storage device 220 and "Nth" storage device 222 may store, load, and/or maintain one or more files having characteristics described by respective classification tags 123. Examples of first storage device 220 and "Nth" storage device 222 include, without limitation, Random Access Memory, Read Only Memory, flash memory, Hard Disk Drives, Solid-State Drives, optical disk drives, caches, variations or combinations of one or more of the same, and/or any other suitable storage memory.

In some examples, servers 206-208 may include and/or be coupled to one or more data store classification source, such as first data store classification source 224 and/or "Nth" data store classification source 226. First data store classification source 224 and "Nth" data store classification source 226 generally represent any type or form of process and/or system configured to generate respective classification tags 123 that classify information stored on storage devices, such as first storage device 220 and "Nth" storage device 222. In some embodiments, first data store classification source 224 and/or "Nth" data store classification source 226 may be coupled to servers 206-208 (e.g., via network 204) and may be provided by computing devices other than servers 206-208.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
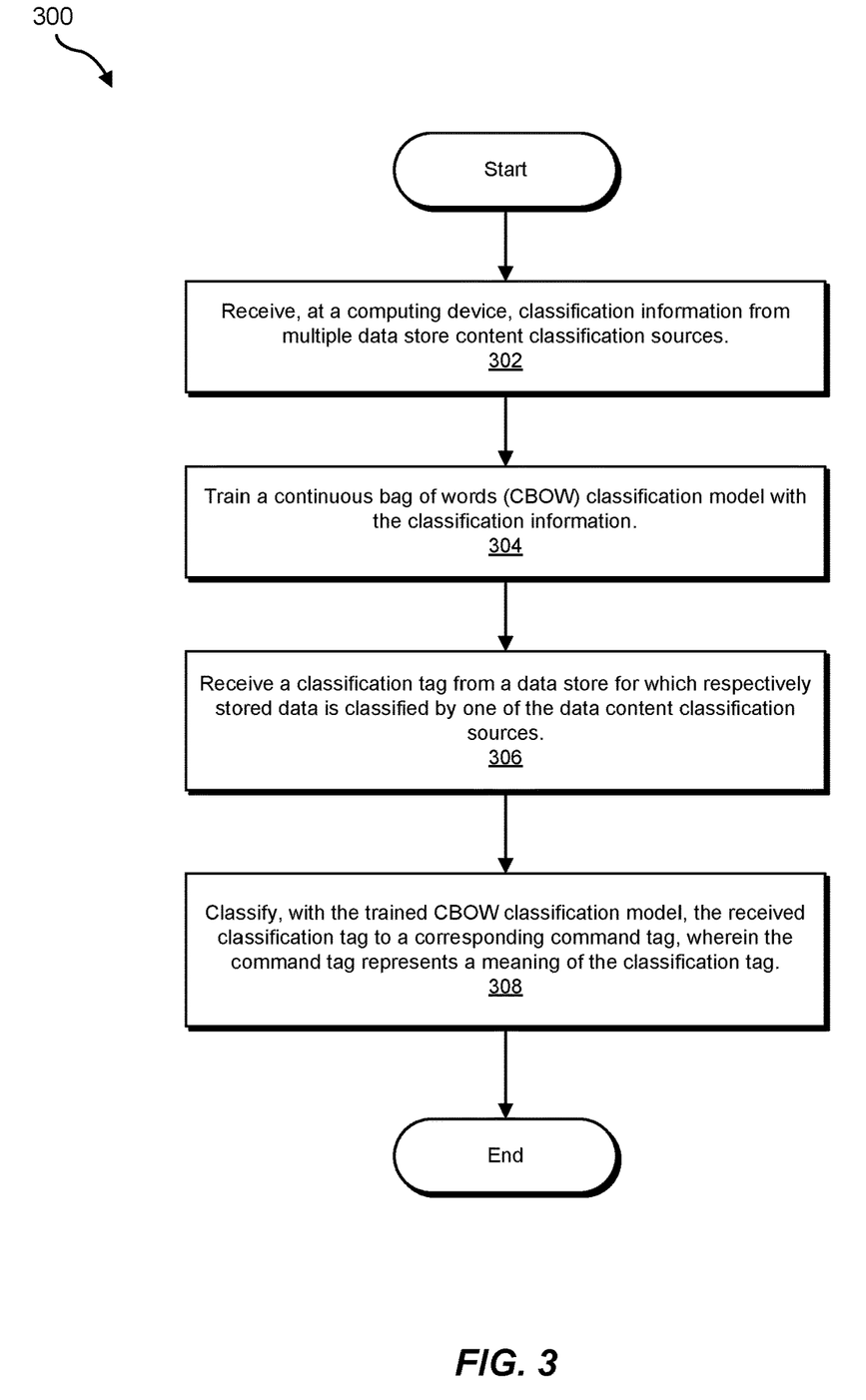
FIG. 3 is a flow diagram of an example method for normalizing data store classification information.

FIG. 3 is a flow diagram of an example computer-implemented method 300 for normalizing data store classification information. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive classification information from multiple data store content classification sources. The systems described herein may perform step 302 in a variety of ways. For example, first receiving module 104 may, as part of computing device 202 in FIG. 2, first server 206 in FIG. 2, and/or server "N" 208 in FIG. 2, receive classification information 121 from multiple data store content classification sources (e.g., first data store classification source 224, "Nth" data store classification source 226, and/or the like).

In some examples, training CBOW classification models may require knowing how different classification sources classify files to produce respective classification tags. Thus, in some embodiments, the classification information may include tags and respective rulesets, where the different classification sources may apply the respective rulesets to determine which classification tag(s) to apply to respective files being classified.

In some embodiments, it may save time and energy to retrain CBOW classifier models without having to retrieve classification information from classification sources. Thus, in some examples, computer-implemented method 300 may further include storing the classification information in storage devices. Classification information may be retrieved at a later time for retraining CBOW classification models and/or other machine learning models.

In an example, the classification sources may include at least one of an automatic classification source configured to classify stored data, a manual classification source, and/or a third-party classifier configured to classify stored data.

As illustrated in FIG. 3, at step 304 one or more of the systems described herein may train CBOW classification models with the classification information. The systems described herein may perform step 304 in a variety of ways. For example, training module 106 may, as part of computing device 202 in FIG. 2, first server 206 in FIG. 2, and/or server "N" 208 in FIG. 2, train CBOW classification model 122 with classification information 121.

As illustrated in FIG. 3, at step 306 one or more of the systems described herein may receive classification tags from data stores for which respectively stored data may be classified by one of the data store content classification sources. The systems described herein may perform step 306 in a variety of ways. For example, second receiving module 108 may, as part of computing device 202 in FIG. 2, first server 206 in FIG. 2, and/or server "N" 208 in FIG. 2, receive classification tag 123 from server one 206 and/or server "N" 208 for which respectively stored data may be classified by one of the data store content classification sources (e.g., first data store classification source 224, "Nth" data store classification source 226, and/or the like).

In some examples, one or more of the systems described herein may receive classification tags from classification sources which classify respectively stored data. In some examples, one or more of the systems described herein may retrieve classification tags from metadata describing characteristics of stored files. In some embodiments, metadata describing characteristics of stored files may be retrieved and classification tags may be extracted from the metadata.

As illustrated in FIG. 3, at step 308 one or more of the systems described herein may classify, with the trained CBOW classification models, the received classification tags to corresponding command tags, where the command tags represent respective meanings of the classification tags. The systems described herein may perform step 308 in a variety of ways. For example, classifying module 110 may, as part of computing device 202 in FIG. 2, first server 206 in FIG. 2, and/or server "N" 208 in FIG. 2, classify, with trained CBOW classification model 122, received classification tag 123 to a corresponding command tag 124, where the command tag 124 represents a meaning of classification tag 123.

In some embodiments, when CBOW classification models are already trained, method 300 may include performing steps 306 and 308 without performing steps 302 and 304.

In some examples, when CBOW classification models are already trained, method 300 may include performing steps 306 and 308 again on subsequently received classification tags. In some embodiments, computer-implemented method 300 may further include receiving different classification tags and classifying the different classification tags with the trained CBOW classification models to the corresponding command tags. In some embodiments, the command tags represent meanings of the different classification tags.

In an embodiment, command tags may indicate presences of PII. Command tags indicating presences of PII may then, in turn, be used to trigger actions, such as warnings and/or security actions. In some embodiments, computer-implemented method 300 may further include (1) identifying, in response to classifying the received classification tags to the corresponding command tags, potential security risks and/or (2) performing, in response to identifying the potential security risks, security actions in an attempt to ameliorate the potential security risks.

In some examples, computer-implemented method 300 may further include generating reports in response to classifying the received classification tags to the corresponding command tags. In an example, the method may further include sending the reports to user displays (e.g., on display 150). In an embodiment, the method may further include sending the reports via network devices (e.g., network interface 160, network 204, and/or the like).

In some examples, computer-implemented method 300 may further include (1) receiving, from the data stores, tag data corresponding to data stored on the data store, (2) converting, using the trained CBOW classification model, the tag data to command tag data, and/or (3) generating reports from the command tag data.

In an example, computer-implemented method 300 may further include mapping the classification tags to the corresponding command tags and/or storing the mapping in storage devices. In an embodiment, the method may further include receiving the classification tags again and classifying, using the mapping, the classification tags to the corresponding command tag.

As detailed above, the steps outlined in computer-implemented method 300 in FIG. 3 may provide methods for normalizing data store classification information and, in some examples, automatically performing an action in response to the same. In some examples, the provided systems and methods may enable classification processes to contribute classification information for normalizing data store classification information. In some examples, the provided systems and methods may automatically normalize classification information coming from various data store content classification sources and automatically take actions in response, thus securely managing and providing a higher level of protection for sensitive information. Further, the systems and methods described herein may improve the functionality of computing devices by automatically providing a single consolidated interface to different classification sources. In addition, the systems and methods described herein may improve the functionality of computing devices by automatically improving data protection services and/or associated software. The systems and methods described herein may also improve the functionality of computing devices by automatically saving power, better-managing information storage devices, and/or better-managing network bandwidth utilization.

Figure 4:
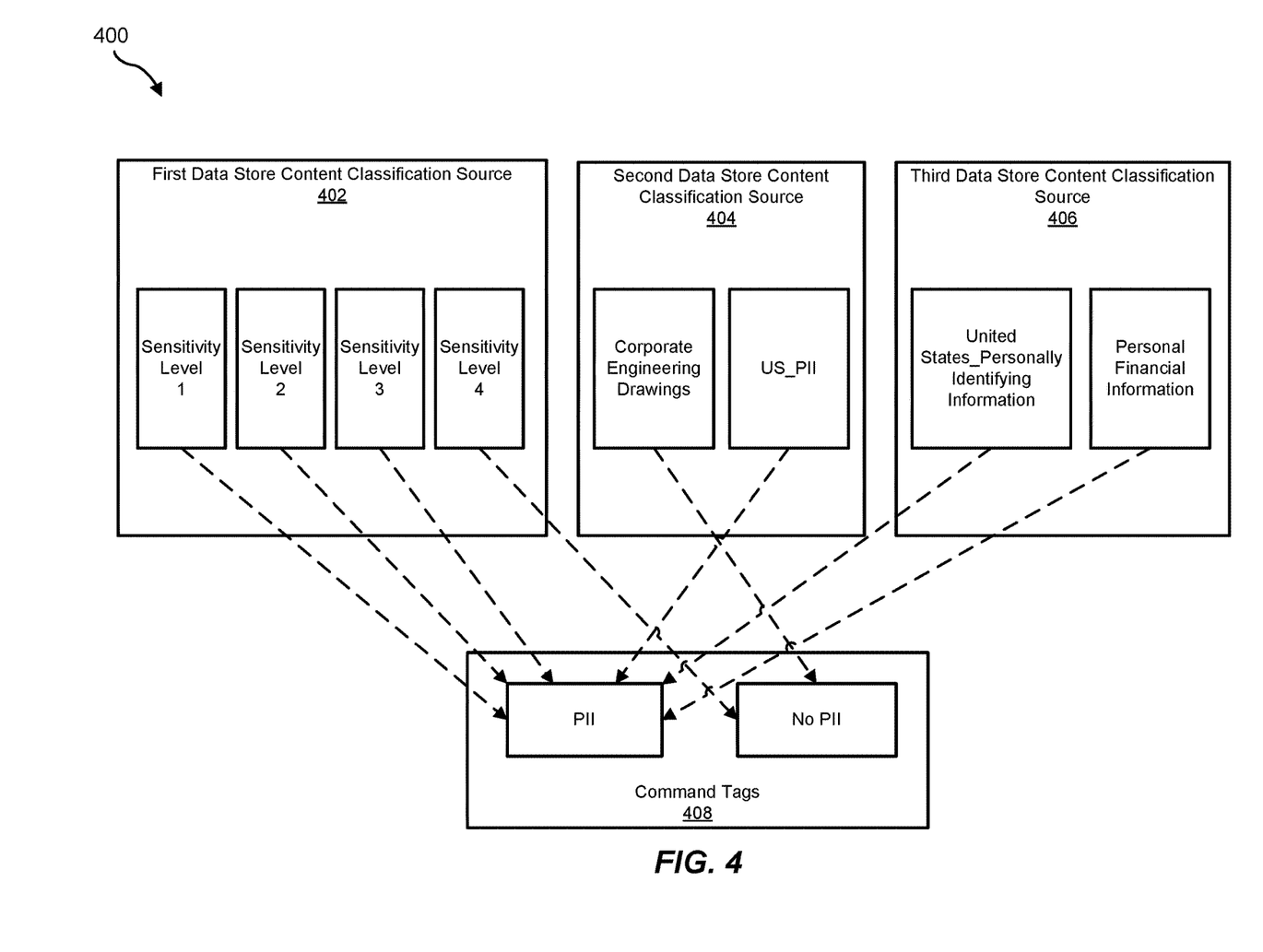
FIG. 4 is a block diagram of normalizing example classification tags to respective example command tags using the provided techniques.

FIG. 4 is a block diagram of example normalizing 400, to respective command tags 408, of (1) respective classification tags capable of being applied by a first data store content classification source 402, (2) respective classification tags capable of being applied by a second data store content classification source 404, and/or (3) respective classification tags capable of being applied by a third data store content classification source 406. In some non-limiting embodiments, FIG. 4 also depicts mapping of classification tags capable of being applied by content classification sources 402-406 to command tags 408.

In this example, classification tags capable of being applied by first data store content classification source 402 may include "sensitivity level one," "sensitivity level two," "sensitivity level three," and "sensitivity level four." In this non-limiting example, classification tags "sensitivity level one," "sensitivity level two," and "sensitivity level three" may normalize to command tag "PII" in command tags 408. Further, in this example, classification tag "sensitivity level four" may normalize to a command tag of "No PII" in command tags 408.

In this example, classification tags capable of being applied by second data store content classification source 404 may include "corporate engineering drawings" and "US_PII." In this non-limiting example, classification tag "corporate engineering drawings" may normalize to command tag "No PII" in command tags 408. Further, in this example, classification tag "US_PII" may normalize to a command tag of "PII" in command tags 408.

In this example, classification tags capable of being applied by third data store content classification source 402 may include "United States_personally identifying information" and "Personal Financial Information." In this non-limiting example, classification tags "United States_personally identifying information" and "Personal Financial Information" may normalize to command tag "PII" in command tags 408.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for normalizing data store classification information, at least a portion of the method being performed by a computing device comprising at least one processor, the method comprising:
   receiving, at the computing device, classification information from multiple different data store content classification sources;
   training a continuous bag of words (CBOW) classification model with the classification information;
   receiving a classification tag from a data store, wherein the classification tag indicates a classification of respectively stored data that is classified by one of the data store content classification sources, wherein the one of the data store content classification sources comprises a set including a plurality of different sensitivity levels;
   classifying, automatically and with the trained CBOW classification model, the received classification tag to a corresponding command tag in a uniform tag set, wherein the command tag represents a meaning of the classification tag, wherein the command tag further indicates a presence or absence of personally identifiable information (PII), and wherein the classification tag is normalized to the corresponding command tag as the presence of the PII based on a first subset of the plurality of different sensitivity levels and the absence of the PII based on a second subset of the plurality of information sensitivity levels;
   identifying, in response to classifying the received classification tag to the corresponding command tag, a potential security risk; and
   performing, in response to identifying the potential security risk, a security action in an attempt to ameliorate the potential security risk, wherein the security action comprises limiting access to the data store based on each of the plurality of different sensitivity levels.

2. The computer-implemented method of claim 1, wherein the classification information comprises a tag and a ruleset.

3. The computer-implemented method of claim 1, further comprising storing the classification information in a storage device.

4. The computer-implemented method of claim 1, wherein the classification sources comprise at least one of:
   an automatic classification source configured to classify stored data;
   a manual classification source; and
   a third-party classifier configured to classify stored data.

5. The computer-implemented method of claim 1, further comprising generating, in response to classifying the received classification tag to the corresponding command tag, a report.

6. The computer-implemented method of claim 5, further comprising sending the report to a user display.

7. The computer-implemented method of claim 5, further comprising sending the report via a network device.

8. The computer-implemented method of claim 1, further comprising:
   receiving a different classification tag; and
   classifying the different classification tag with the trained CBOW classification model to the corresponding command tag, wherein the command tag represents a meaning of the different classification tag.

9. The computer-implemented method of claim 1, further comprising:
   receiving, from the data store, tag data corresponding to data stored on the data store;
   converting, using the trained CBOW classification model, the tag data to command tag data; and
   generating a report from the command tag data.

10. The computer-implemented method of claim 1, further comprising:
    mapping the classification tag to the corresponding command tag; and
    storing the mapping in a storage device.

11. The computer-implemented method of claim 10, further comprising:
    receiving the classification tag again; and
    classifying, using the mapping, the classification tag to the corresponding command tag.

12. The computer-implemented method of claim 1, wherein the respectively stored data is a file.

13. A system for normalizing data store classification information, the system comprising:
    a first receiving module, stored in a memory, that receives, at the system, classification information from multiple different data store content classification sources;
    a training module, stored in the memory, that trains a continuous bag of words (CBOW) classification model with the classification information;
    a second receiving module, stored in the memory, that receives a classification tag from a data store, wherein the classification tag indicates a classification of respectively stored data that is classified by one of the data store content classification sources, wherein the one of the data store content classification sources comprises a set including a plurality of different sensitivity levels;
    a classifying module, stored in the memory, that automatically classifies, with the trained CBOW classification model, the received classification tag to a corresponding command tag in a uniform tag set, wherein the command tag represents a meaning of the classification tag, wherein the command tag further indicates a presence or absence of personally identifiable information (PII), and wherein the classification tag is normalized to the corresponding command tag as the presence of the PII based on a first subset of the plurality of different sensitivity levels and the absence of the PII based on a second subset of the plurality of information sensitivity levels, wherein the classifying module further:
  identifies, in response to classifying the received classification tag to the corresponding command tag, a potential security risk; and
  performs, in response to identifying the potential security risk, a security action in an attempt to ameliorate the potential security risk, wherein the security action comprises limiting access to the data store based on each of the plurality of different sensitivity levels; and
at least one physical processor that executes the first receiving module, the training module, the second receiving module, and the classifying module.

14. The system of claim 13, wherein the classification information comprises a tag and a ruleset.

15. The system of claim 13, wherein the respectively stored data is a file.

16. The system of claim 13, wherein the classification sources comprise at least one of:
  an automatic classification source configured to classify stored data;
  a manual classification source; and
  a third-party classifier configured to classify stored data.

17. A non-transitory computer-readable medium comprising one or more computer-executable instructions that, when executed by at least one processor of a computing device, cause the computing device to:
  receive, at the computing device, classification information from multiple different data store content classification sources;
  train a continuous bag of words (CBOW) classification model with the classification information;
  receive a classification tag from a data store, wherein the classification tag indicates a classification of respectively stored data that is classified by one of the data store content classification sources, wherein the one of the data store content classification sources comprises a set including a plurality of different sensitivity levels;
  classify, automatically and with the trained CBOW classification model, the received classification tag to a corresponding command tag in a uniform tag set, wherein the command tag represents a meaning of the classification tag, wherein the command tag further indicates a presence or absence of personally identifiable information (PII), and wherein the classification tag is normalized to the corresponding command tag as the presence of the PII based on a first subset of the plurality of different sensitivity levels and the absence of the PII based on a second subset of the plurality of information sensitivity levels;
  identifying, in response to classifying the received classification tag to the corresponding command tag, a potential security risk; and
  performing, in response to identifying the potential security risk, a security action in an attempt to ameliorate the potential security risk, wherein the security action comprises limiting access to the data store based on each of the plurality of different sensitivity levels.

18. The non-transitory computer-readable medium of claim 17, wherein the classification information comprises a tag and a ruleset.

19. The non-transitory computer-readable medium of claim 17, wherein the respectively stored data is a file.

20. The non-transitory computer-readable medium of claim 17, wherein the classification sources comprise at least one of:
  an automatic classification source configured to classify stored data;
  a manual classification source; and
  a third-party classifier configured to classify stored data.

* * * * *